United States Patent Office 3,136,779
Patented June 9, 1964

3,136,779
1-PROPARGYL-2-METHYL-3-PHENYL-3-
PROPIONYLOXY-PYRROLIDINES
John Frederick Cavalla, Isleworth, Middlesex, England,
assignor to Parke, Davis & Company, Detroit, Mich., a
corporation of Michigan
No Drawing. Filed Jan. 25, 1962, Ser. No. 168,818
Claims priority, application Great Britain Feb. 9, 1961
3 Claims. (Cl. 260—326.3)

The present invention relates to pyrrolidine compounds. More specifically the invention relates to 1 - propargyl-2-methyl-3-phenyl-3-propionyloxypyrrolidine of the formula

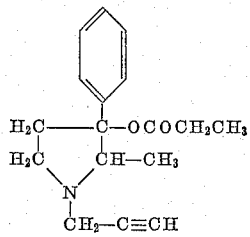

to acid-addition salts thereof, and to methods for their production.

According to the invention 1-propargyl-2-methyl-3-phenyl-3-propionyloxypyrrolidine and acid-addition salts thereof can be produced by reacting 2-methyl-3-phenyl-3-propionyloxypyrrolidine with a propargyl halide such as the chloride, bromide or iodide. The reaction is preferably carried out by heating the reactants in an unreactive solvent such as methanol, ethanol or another lower alkanol at 30–100° C. for from one to eight hours. The pyrrolidine derivative and the propargyl halide are usually employed in approximately equimolar quantities although a slight or moderate excess of either can be used. Preferably the reaction is carried out in the presence of an inorganic base such as sodium carbonate or potassium carbonate in which case the reaction product can be isolated directly as the free base, or converted to an acid-addition salt.

1-propargyl-2-methyl-3-phenyl-3 - propionyloxypyrrolidine forms acid-addition salts by reaction with acids such as hydrochloric, hydrobromic, sulfuric, phosphoric, acetic, benzoic, tartaric, maleic, benzenesulfonic and citric acids. The acid-addition salts are converted to the free base by methods such as treatment with an inorganic base such as sodium hydroxide or sodium carbonate. If desired the compounds of the invention can also be obtained in optically active forms by using an optically active pyrrolidine derivative as starting material or by resolving an optically inactive final product by fractional crystallization of a salt or an ester formed with an optically active acid.

The compounds of the invention are pharmacological agents and are chemical intermediates useful in the preparation of other pyrrolidine derivatives. The compounds of the invention possess a high degree of analgetic activity and are useful as analgesic agents because they have the ability to relieve severe pain without producing deleterious side effects associated with the use of alkaloidal analgesics. The propargyl group at position 1 leads to higher activity than that found in other N-hydrocarbon derivatives of related chemical structure. The compounds can be administered either orally or parenterally.

The invention is illustrated but not limited by the following example.

Example

A stirred mixture of 5 g. of 2-methyl-3-phenyl-3-propionyloxypyrrolidine hydrochloride, 2.2 g. of propargyl bromide, 7.7 g. of potassium carbonate and 60 ml. of ethanol is heated under reflux for three hours. The reaction mixture is cooled, filtered and concentrated in vacuo to give a residue of 1-propargyl-2-methyl-3-phenyl-3-propionyloxypyrrolidine. The hydrochloride is obtained by dissolving the free base in 15 ml. of absolute ethanol, filtering the solution and treating the filtrate with hydrogen chloride in ether; M.P. 181–182° C. after crystallizations from ethanol-ether mixtures. A water soluble citrate is obtained by mixing methanolic solutions of the free base and citric acid and concentrating to a small volume. The acid-addition salts are reconverted to the free base by treatment of an aqueous solution of an acid-addition salt with a base such as sodium hydroxide or potassium carbonate.

I claim:

1. A member of the class consisting of 1-propargyl-2-methyl-3-phenyl-3-propionyloxypyrrolidine and non-toxic acid-addition salts thereof.

2. 1-propargyl-2-methyl-3-phenyl - 3 - propionyloxypyrrolidine.

3. 1-propargyl-2-methyl-3-phenyl - 3 - propionyloxypyrrolidine hydrochloride.

References Cited in the file of this patent
UNITED STATES PATENTS
2,978,454    Elpern _____ Apr. 4, 1961